United States Patent [19]

Tajima

[11] Patent Number: 5,701,212
[45] Date of Patent: Dec. 23, 1997

[54] DIGITAL TAPE RECORDER HAVING SYNC DETECTION BASED ON A CORRELATION BETWEEN EXTRACTED SYNC AND ID FIELDS

[75] Inventor: Hiroshi Tajima, Kanagawa, Japan

[73] Assignee: Sony Corporation, Tokyo, Japan

[21] Appl. No.: 596,438

[22] Filed: Feb. 2, 1996

[30] Foreign Application Priority Data

Feb. 3, 1995 [JP] Japan .................... 7-039123

[51] Int. Cl.$^6$ .................... G11B 5/09
[52] U.S. Cl. .................... 360/51
[58] Field of Search .................... 360/51, 53; 386/48, 386/49, 50; 369/60

[56] References Cited

U.S. PATENT DOCUMENTS

| | | | |
|---|---|---|---|
| 4,618,898 | 10/1986 | Young et al. | 360/51 |
| 5,357,380 | 10/1994 | Bailey et al. | 360/51 |
| 5,392,129 | 2/1995 | Ohtaka et al. | 386/48 |
| 5,426,538 | 6/1995 | Kanota et al. | 360/48 |
| 5,546,243 | 8/1996 | Setoyama | 360/51 |

Primary Examiner—Aristotelis M. Psitos
Assistant Examiner—Alan Faber
Attorney, Agent, or Firm—William S. Frommer; Alvin Sinderbrand

[57] ABSTRACT

An 8–9 converting circuit converts 8-bit data into 9-bit parallel data. A sync pattern/ID pattern adding circuit adds sync patterns and ID patterns to the 9-bit parallel data and sets values for the ID patterns according to a predetermined correlation between a position of an mth ID pattern and a distance from an nth sync pattern to an mth sync pattern. A parallel/serial converting circuit converts the parallel data into serial data and the resultant serial data is recorded on a tape. Data reproduced from a tape is supplied to a serial/parallel converting circuit which converts the serial data into parallel data. A sync pattern/ID pattern extracting circuit extracts sync patterns and ID patterns from the parallel data, extracting as valid an mth sync pattern whose corresponding mth ID pattern has a value set in accordance with the predetermined correlation. An 8–9 inverse converting circuit converts the parallel data into 8-bit data corresponding to the extracted sync patterns and ID patterns.

7 Claims, 13 Drawing Sheets

DIGITAL TAPE RECORDER HAVING SYNC DETECTION BASED ON A CORRELATION BETWEEN EXTRACTED SYNC AND ID FIELDS

BACKGROUND OF THE INVENTION

1. Field of the Invention

The present invention relates to a data recorder for recording and reproducing digital data received from an externally connected computer.

2. Description of the Related Art

A drive unit that can load a cassette tape on which digital data is recorded is known as a data recorder. In this case, the drive unit is connected to a host computer through an interface.

Such a data recorder is connected to the host computer through an interface unit corresponding to for example the SCSI (Small Computer System interface) standard. Since the host computer recognizes the interface unit as a data recorder, it has a function for generating a file format on a tape and sending/receiving data to/from the tape (this function is referred to as formatter). The interface unit has a buffer memory that temporarily stores data transmitted between the host computer and the data recorder.

Figure 1:
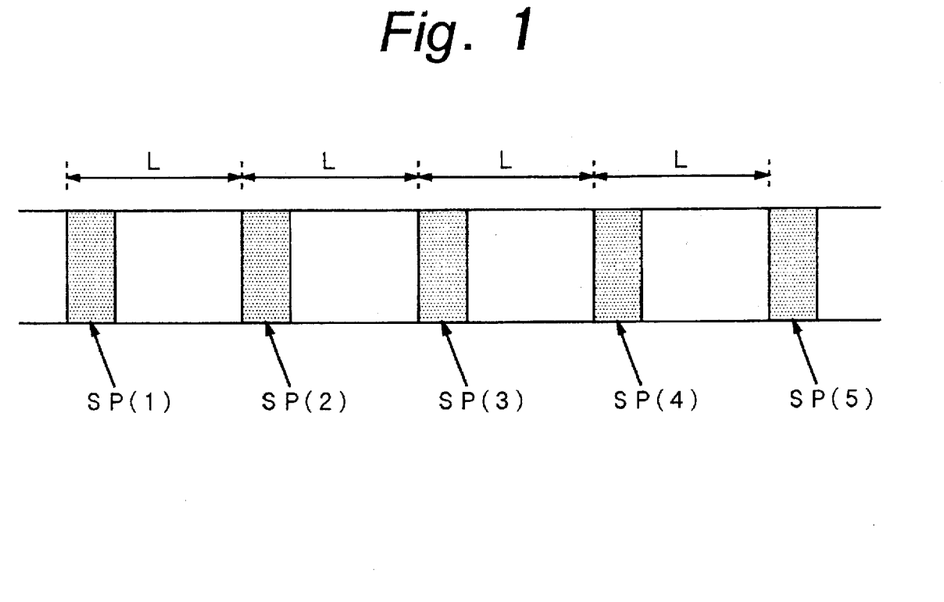
FIG. 1 is a schematic diagram showing a tape on which sync patterns are recorded.

Data is recorded on a cassette tape in a serial format. In other words, 8-bit parallel data is input and converted into 9-bit data. In addition, sync patterns (SPs) are added to the 9-bit data. Thereafter, the 9-bit parallel data is converted into serial data. The resultant serial data is recorded on the cassette tape. When data is reproduced from the cassette tape, serial data is read from the cassette tape and converted into 9-bit parallel data. SPs are extracted from the 9-bit parallel data. Thereafter, an 8–9 inverse conversing process is performed. As shown in FIG. 1, the SPs are recorded at predetermined intervals L on the tape as fixed patterns. When data is reproduced, the SPs are extracted and the 8–9 inverse converting process is performed corresponding to the extracted SPs. Thus, the converting process can be accurately performed.

When data is magnetically recorded, part of data may be incorrectly recorded or lost. In such cases, when data is reproduced, an SP may be not extracted or improper data may be extracted as an SP. To accurately extract SPs, in addition to extracting SPs, it is determined whether or not the intervals L of the SPs are correct.

Figure 2:
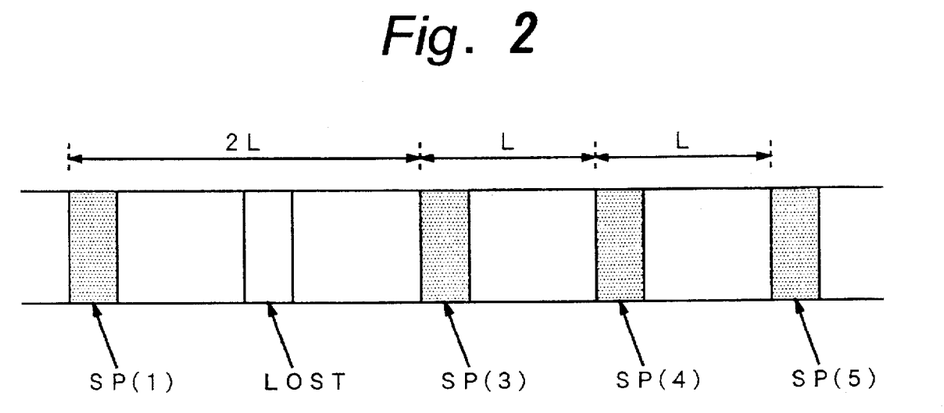
FIG. 2 is a schematic diagram showing a tape of which a sync pattern is lost.

FIG. 2 is a schematic diagram showing a tape on which one SP is lost. In FIG. 2, when the second SP counted from the reproduction start point is lost, the distance between SP(1) and SP(3) becomes 2L. Thus, SP(1) and SP(3) are recognized as SPs. At this point, the intervals of SPs are recognized as 2L. Thus, with reference to SP(3), SP(4) recorded at the position of the distance L is not recognized as an SP. When an SP is incorrectly extracted, the next SP is also affected by a burst error.

In addition, SPs are extracted with reference to a forward positioned SP or a backward positioned SP. When a forward positioned SP or a backward positioned SP is referenced, the top SP or the last SP should be extracted with a special process.

OBJECT AND SUMMARY OF THE INVENTION

The present invention is made from the above described point of view. An object of the present invention is to provide a data recorder that can prevent a sync pattern from being incorrectly extracted and can extract the top and last sync patterns without need to perform a special process.

The present invention is a recording/reproducing apparatus for recording/reproducing digital data to/from a tape shaped recording medium, comprising a modulating circuit for modulating the digital data, an adding circuit for adding a pairs of a sync pattern and an ID pattern to each block of data that is output from the modulating circuit, a recording circuit for recording output data of the adding circuit to the tape shaped recording medium, a reproducing circuit for reproducing data from the tape shaped recording medium, a detecting circuit for detecting sync patterns from the reproduced data, and a demodulating circuit for demodulating the reproduced data corresponding to the detected sync patterns, wherein the detecting circuit is adapted for detecting the sync patterns corresponding to the collation between the intervals of the sync patterns in the reproduced data and values of the ID patterns in the reproduced data.

Figure 9:
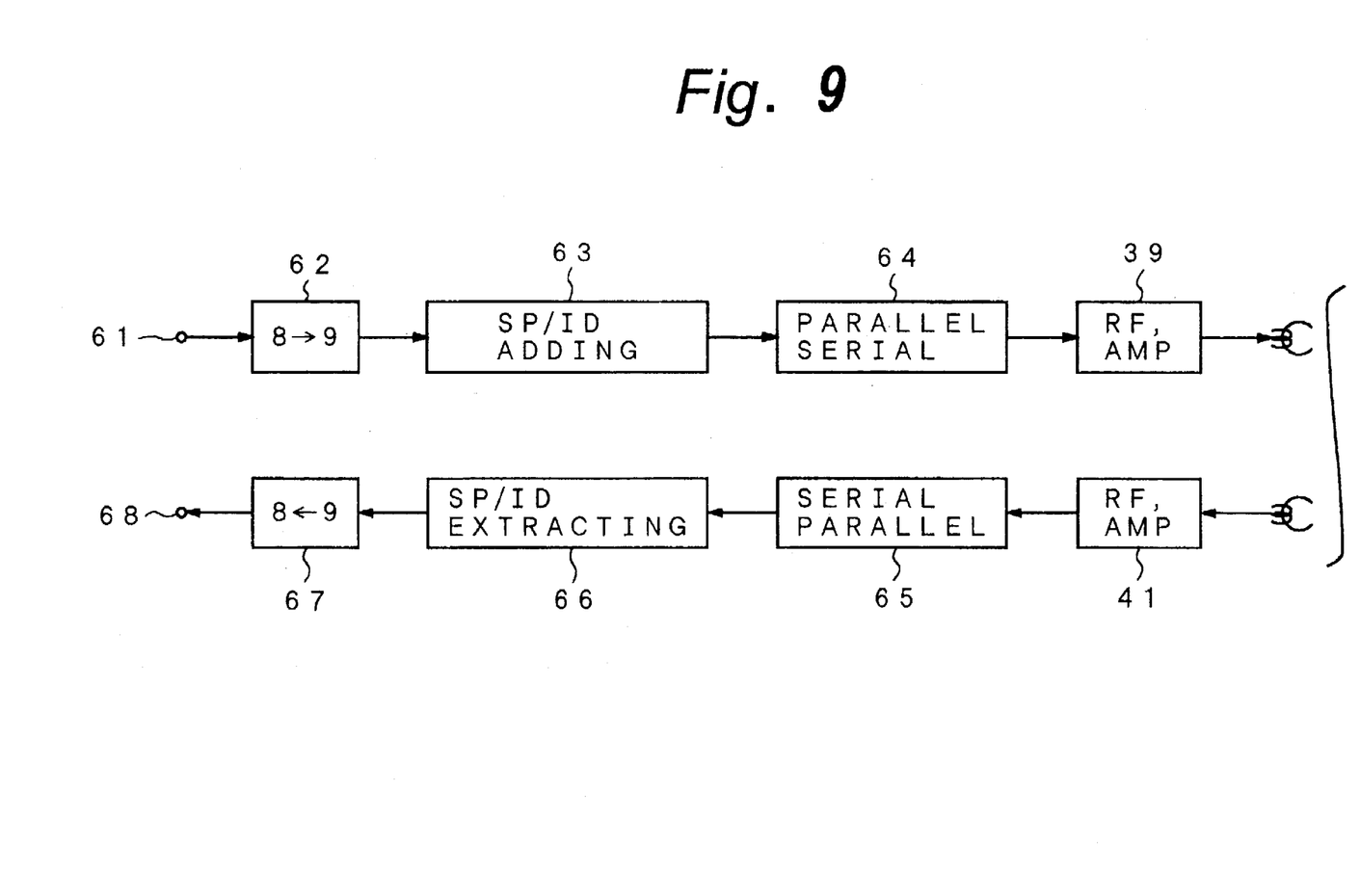
FIG. 9 is a detailed block diagram showing a channel code encoder and a channel code decoder.

An 8–9 converting circuit 62 converts 8-bit parallel data into 9-bit parallel data. The resultant 9-bit parallel data is supplied to a sync pattern/ID pattern adding circuit 63. The sync pattern/ID pattern adding circuit 63 adds sync patterns and ID patterns to the 9-bit parallel data. The resultant 9-bit parallel data with the sync patterns and the ID patterns is supplied to a parallel/serial converting circuit 64. The parallel/serial converting circuit 64 converts the parallel data into serial data. The resultant serial data is recorded on a tape. Serial data reproduced from a tape is supplied to a serial/parallel converting circuit 65. The serial/parallel converting circuit 65 converts the serial data into 9-bit parallel data. The resultant 9-bit parallel data is supplied to a sync pattern/ID pattern extracting circuit 66. The sync pattern/ID pattern extracting circuit 66 extracts sync patterns and ID patterns from the parallel data. The parallel data, the sync patterns, and the ID patterns are supplied to an 8–9 inverse converting circuit 67. The 8–9 inverse converting circuit 67 performs a bit converting process corresponding to the extracted sync patterns and ID patterns. Thus, bit matching for the data is performed. In addition, a timing signal than represents the top of a block is generated.

These and other objects, features and advantages of the present invention will become more apparent in light of the following detailed description of best mode embodiments thereof, as illustrated in the accompanying drawings.

DESCRIPTION OF THE PREFERRED EMBODIMENTS

Figure 3:
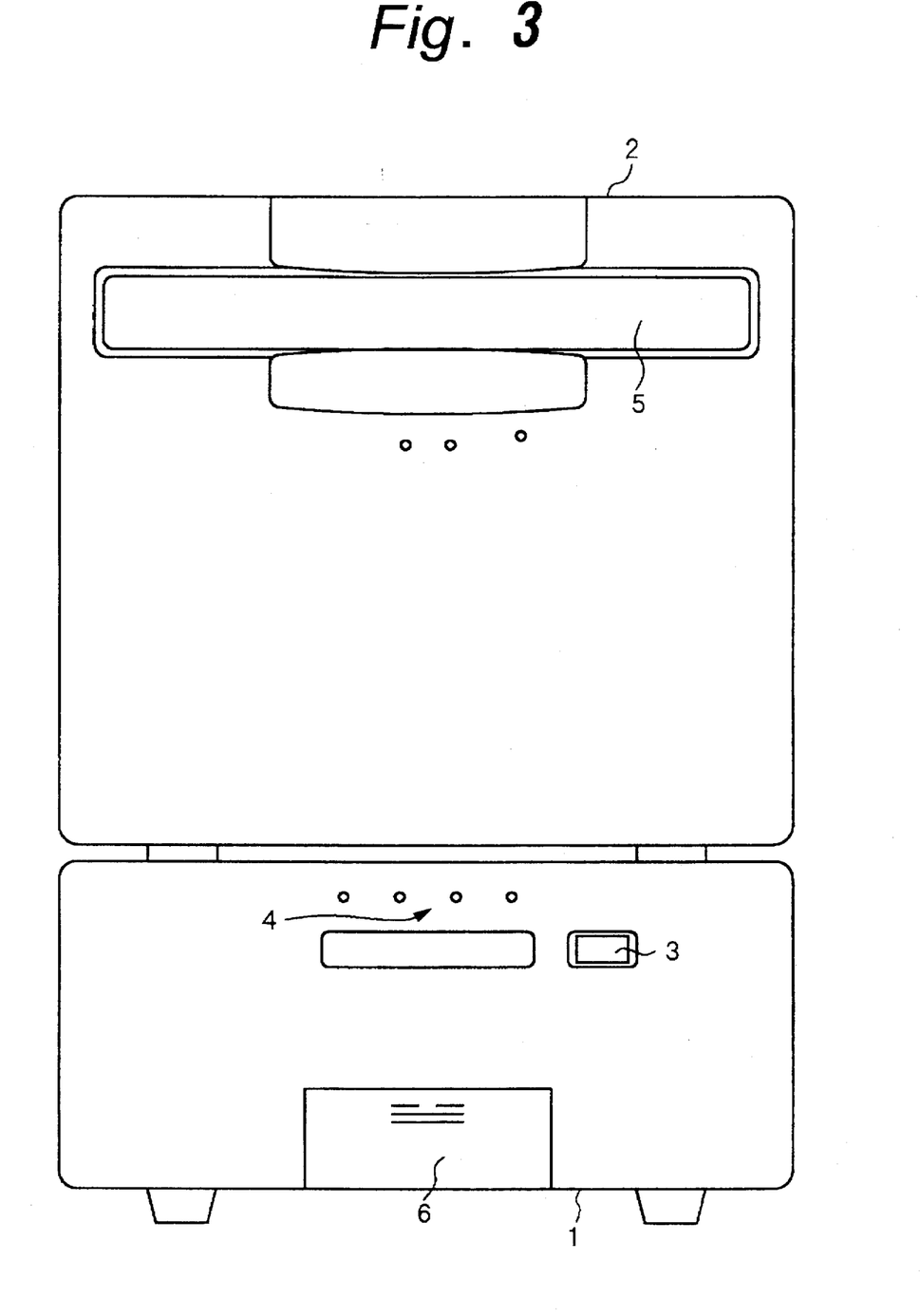
FIG. 3 is a front view schematically showing a data recorder according to the present invention.
Figure 4:
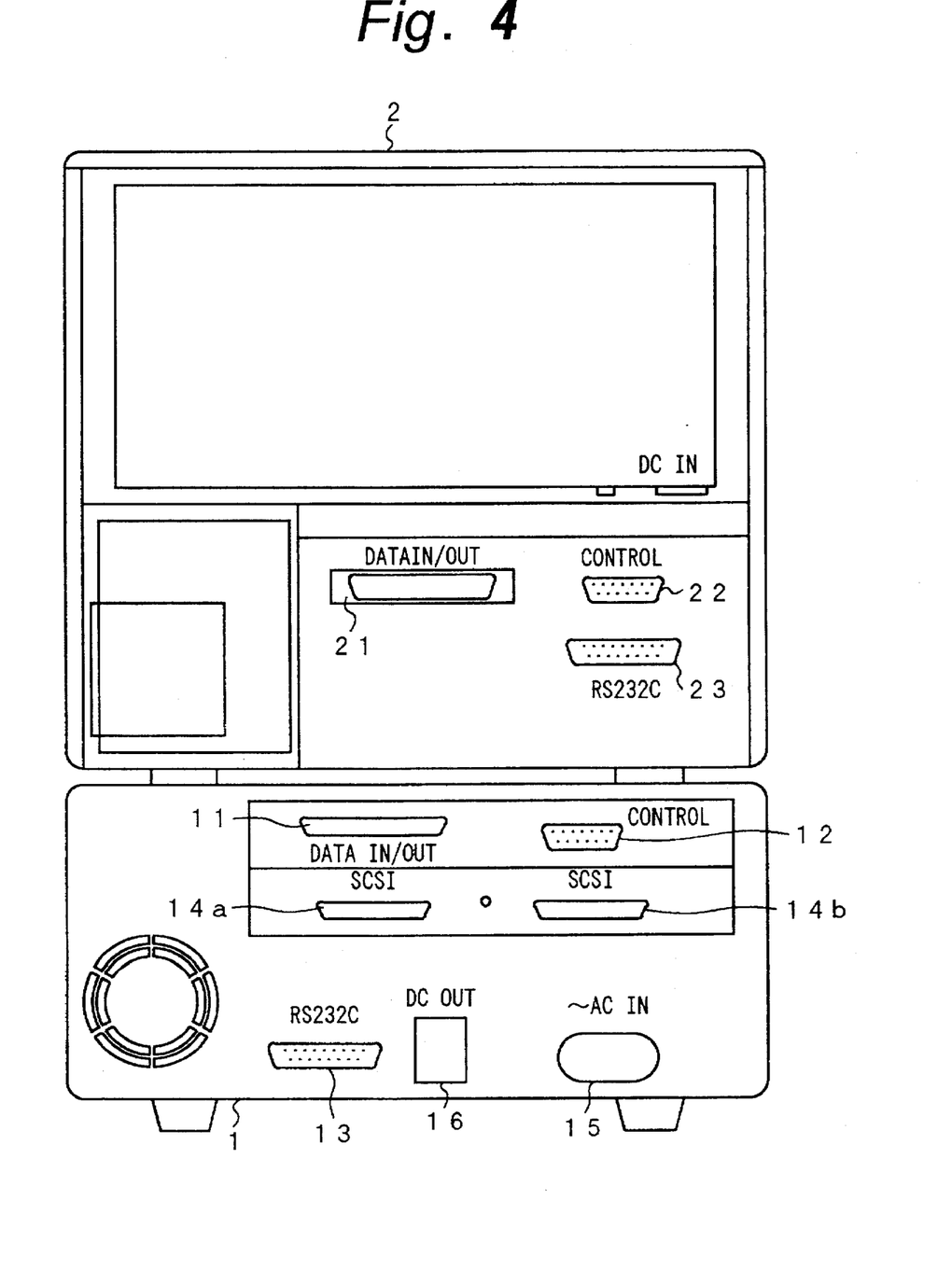
FIG. 4 is a rear view schematically showing the data recorder according to the present invention.

Next, with reference to the accompanying drawings, a data recorder according no the present invention will be described. The data recorder records/reproduces digital data to/from a cassette nape with a rotating head. FIG. 3 is a front view showing the data recorder. FIG. 4 is a rear view showing the data recorder.

As shown in FIGS. 3 and 4, the data recorder is composed of two units that are an upper unit and a lower unit. The lower unit is literally disposed below the upper unit. The lower unit is a tape drive controller 1. The upper unit is a digital information recorder 2. The tape drive controller 1 has a front panel that includes a button 3 and a plurality of light emitting diodes 4. The button 3 is used to perform the loading/unloading operations for a cassette tape. The light emitting diodes 4 represent whether or not a cassette tape has been loaded, whether or not the power has been turned on, and so forth. In addition, the digital information recorder 2 has a detachable panel 6. Inside the detachable panel 6, other operation buttons are disposed. The digital information recorder 2 has a front panel with a cassette tape loading/unloading opening 5.

As shown in FIG. 4, on the rear panels of the tape drive controller 1 and the digital information recorder 2, a plurality of connectors are disposed. On the rear panel of the lower tape drive controller 1, a data input/output connector 11, a control connector 12, an RS232C connector 13, two SCSI connectors 14a and 14b, an AC power input connector 15, and a DC power output connector 16 are disposed.

On the rear panel of the digital information recorder 2, a data input/output connector 21, a control connector 22, and an RS232C connector 23 are disposed. By connecting a dedicated cable to the DC power output connector 16 of the tape drive controller 1, power is supplied to the digital information recorder 2. The data input/output connectors 11 and 21 are connected with a dedicated cable. Data is sent and received between the controller 1 and the recorder 2. The control connectors 12 and 22 are connected with a dedicated cable. Thus, control signals are exchanged between the controller 1 and the recorder 2. The RS232C connectors 13 and 23 are used for diagnosis purposes.

Figure 5:
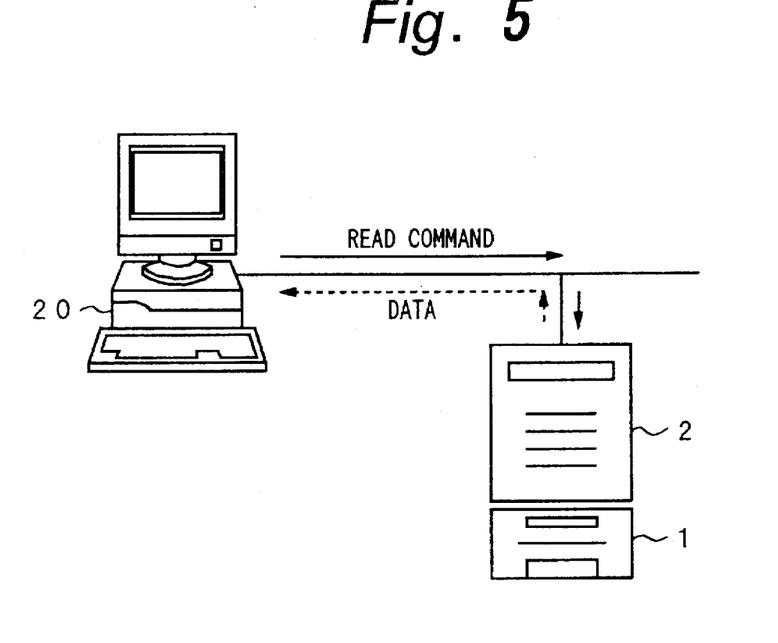
FIG. 5 is a schematic diagram showing an example of the application of the data recorder according to the present invention.

When a host computer 20 is connected to the data recorder, the SCSI connectors 14a and 14b are used. As shown in FIG. 5, when the host computer 20 sends for example a read command to the data recorder, the data recorder reads data from the Tape and outputs the data to the host computer 20.

Figure 6:
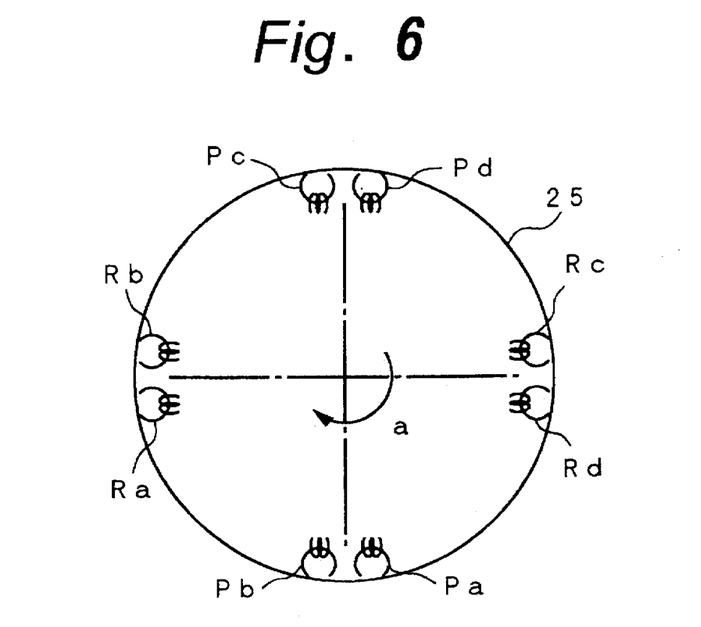
FIG. 6 is a schematic diagram showing a structure of heads of the data recorder.

The digital information recorder 2 records/reproduces data to/from a cassette tape with rotating heads. (In the following description, the rotating heads may be treated as a single head for convenience.) FIG. 6 shows the arrangement of the heads used in the recorder 2. Four record heads Ra, Rb, Rc, and Rd and four reproduction (playback) heads Pa, Pb, Pc, and Pd are disposed on a drum 25 that rotates at a predetermined speed in the direction denoted by a in FIG. 6.

The heads Ra and Rb are adjacently disposed. This relation applies to pairs of heads Rc and heads Pa and Pb, and heads Pc and Pd. The extended directions of each pair of heads are different from each other. The extended directions are referred to as azimuths. Referring to FIG. 6, the heads Ra and Rc are oppositely disposed at an interval of 180° and have a first azimuth. The heads Rb and Rd are oppositely disposed at an interval of 180° and have a second azimuth. The heads Pa and Pc have the first azimuth. The heads Pb and Pd have the second azimuth. With the different azimuths, cross talks can be prevented between adjacent tracks. Each of the adjacent heads is integrally composed as one head. The integrally composed head is referred to as double-azimuth head.

A tape (for example, ½ inch wide) that is led out of the cassette is helically wound around the periphery of the drum 25 for an angle range of 180° or greater. The tape is supplied at a predetermined speed. Thus, when a signal is recorded to the tape, in the first half period of one rotation of the drum 25, the heads Ra and Rb scan the tape. In the second half period, the heads Rc and Rd scan the tape. When a signal is reproduced from the tape, in the first half period, the heads Pa and Pb scan the nape. In the second half period, the heads Pc and Pd scan the tape.

Figure 7:
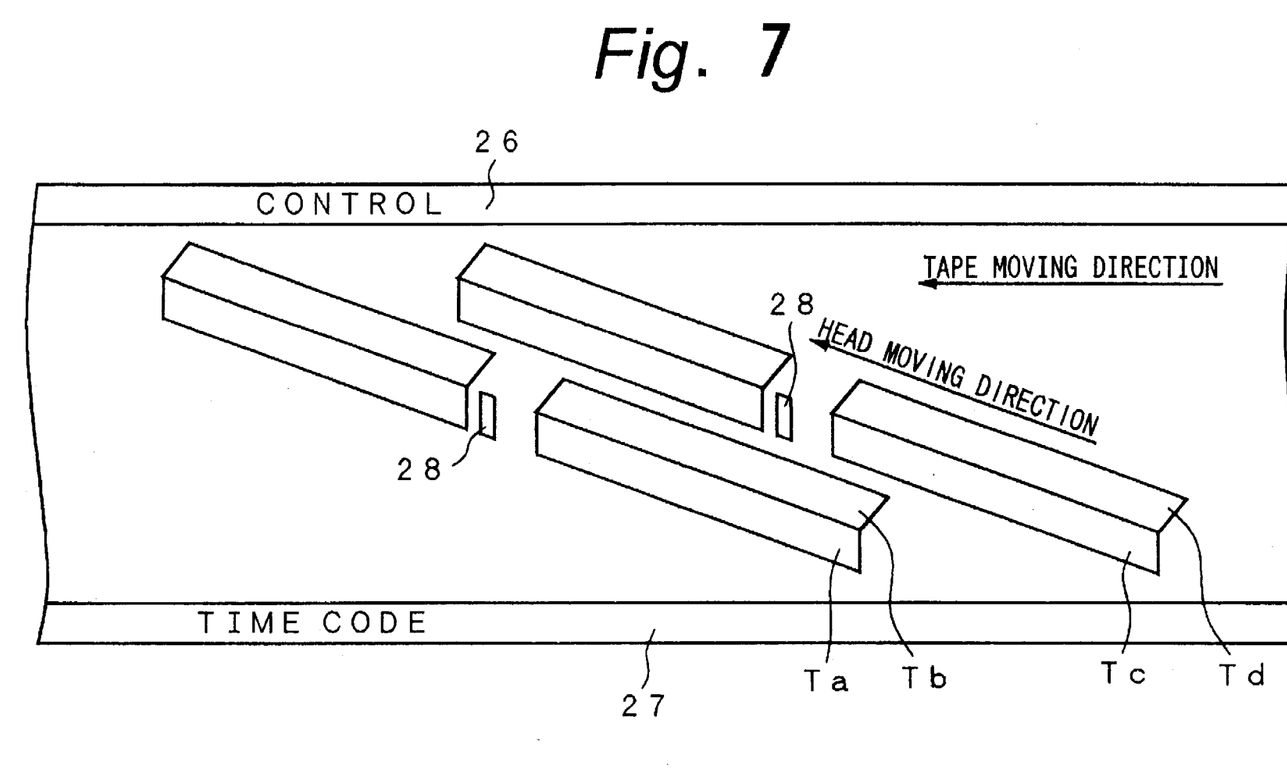
FIG. 7 is a schematic diagram showing track patterns on a cassette tape for use with the data recorder according to the present invention.

FIG. 7 shows track patterns on the tape of the digital information recorder 2. Longitudinal tracks are disposed in the width direction of the tape. Helical tracks are disposed between the longitudinal tracks. A control signal is recorded on an upper longitudinal track 26. A time code is recorded on a lower longitudinal track 27. The time code represents the position in the longitudinal direction of the tape. For example, the time code is an SMPTE time code. Whenever the drum 25 is rotated by one turn, the head Ra and Rb form two helical tracks Ta and Tb at the same time. Thereafter, the heads Ra and Rb form two helical tracks Tc and Td at the same time. On each helical track, a first half portion and a second half portion are separately formed. Between the first half portion and the second half portion of each helical track, a record area 28 is disposed. The record area 28 is used to record a tracking pilot signal.

The SMPTE time code was developed for a video signal for use with a VCR or the like. The minimum unit of the SMPTE time code is a frame (1/30 second). As will be described later, in the data recorder, data that can be recorded on the four tracks Ta to Td shown in FIG. 7 is defined as a data unit (that is referred to as track set). When 16 tracks accord with one frame of a video signal, a sub-digit (values 0, 1, 2, and 3) lower than the digit of the frame of the time code is defined. This time code is also referred as ID. Since the SMPTE time code has a user data area, such a modification can be performed.

Figure 8:
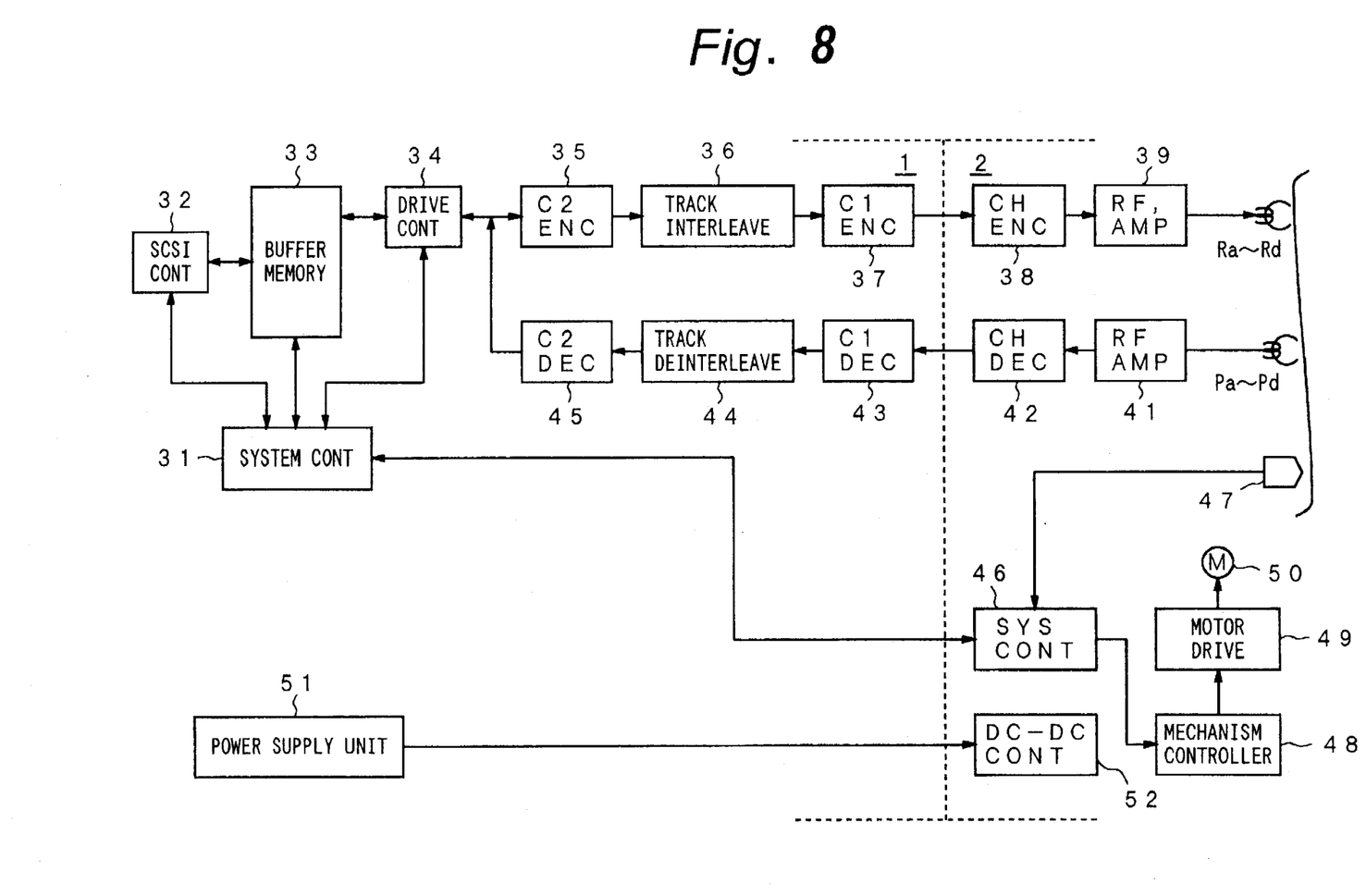
FIG. 8 is a block diagram showing a system structure of the data recorder according to the present invention.

FIG. 8 is a block diagram showing an outlined system structure of the tape drive controller 1 and the digital information recorder 2. The system controller 31 has the following functions.

Managing a SCSI controller 32,

Managing a buffer memory 33,

Managing files/tables,

Managing a data writing/reading operation and a retry operation,

Controlling the digital information recorder 2, and performing self diagnosis.

The tape drive controller 1 is connected to the host computer through the SCSI controller 32. A drive controller 34 is disposed between the buffer memory 33 and the tape drive controller side. Data that is read from the buffer memory 33 is supplied to a C2 encoder 35 through the drive controller 34. A Track interleave circuit 36 and an C1 encoder 37 are connected to the C2 encoder 35.

The C2 encoder 35 and the C1 encoder perform an error correction encoding process for record data with a product code. The track interleave circuit 36 controls the distribution of data to tracks on the tape so as to improve the error correction performance in the data recording/reproducing processes.

When data is recorded on the tape, it is recorded as SYNC blocks separated by a synchronous signal. In this case, the track interleave circuit 36 adds a block synchronous signal to the output signal of the C2 encoder 35. The C1 encoder 37 generates a C1 parity. Thereafter, data is randomized and words are interleaved in a plurality of SYNC blocks.

Digital data that is received from the C1 encoder 37 is supplied to the digital information recorder 2. The digital information recorder 2 encodes digital data received from a channel code encoder 38. The resultant record data is output to the record heads Ra to Rd through an RF amplifier 39. The heads Ra to Rd record the record data on the tape. The RF amplifier 39 performs a process corresponding to partial response class 4 (PR (1, 0, −1)).

Data reproduced from the tape by the reproduction heads Pa to Pd is supplied to a channel code decoder 42 through an RF amplifier 41. The RF amplifier 41 includes a reproducing amplifier, an equalizer, and a Viterbi decoder. The output data of the channel code decoder 42 is supplied to the tape drive controller 1. The output data of the channel code decoder 42 is supplied to a C1 decoder 43.

The C1 decoder 43 is connected to a track deinterleave circuit 44. The track deinterleave circuit 44 is connected to a C2 decoder 45. The C1 decoder 43, the track deinterleave circuit 44, and the C2 decoder 45 perform the reverse processes of the C1 encoder 37, the track interleave circuit 36, and the C2 encoder 35, respectively. The C2 decoder 45 supplies the reproduction (read) data to the buffer memory 33 through the drive controller 34.

The digital information recorder 2 has a system controller 46. In addition, the digital information recorder 2 has a fixed head 47 for the longitudinal tracks on the tape. The head 47 is connected to the system controller 46. The head 47 records/reproduces a control signal and a time code. The system controller 46 is connected to the system controller 31 of the tape drive controller 1 through a bidirectional bus. The system controller 31 determines whether or not data that is recorded or reproduced has an uncorrected error.

A mechanism controller 48 is connected to the system controller 46. The mechanism controller 48 includes a servo circuit that drives a motor 50 through a motor drive circuit 49. The system controller 46 has for example two CPUs. The system controller 46 communicates with the tape drive controller 1, controls recording/reproducing for a time code, controls recording/reproducing timings, and so forth using the CPUs.

The mechanism controller 48 has for example two CPUs. The mechanism controller 48 controls a mechanical system of the digital information recorder 2 with the CPUs. In reality, the mechanical controller 48 controls the rotation of the head and tape system, the tape speed, the tracking operation, loading/unloading processes of the cassette tape, and the tape tension. The motor 50 is a generic term for a drum motor, a capstan motor, a reel motor, a cassette mounting motor, a loading motor, and so forth.

The digital information recorder 2 has a DC—DC converting circuit 52 that receives a DC voltage from a power supply unit 51 of the tape drive controller 1. The digital information recorder 2 also has position sensors (such as a tape end detecting sensor), a time code generating/reading circuit, and so forth (that are not shown).

FIG. 9 is a detailed block diagram showing the channel code encoder 38 and the channel code decoder 42. Encoded data that is output from the C1 encoder 37 is supplied to an 8–9 converting circuit 62 through a terminal 61. The 8–9 converting circuit 62 converts 8-bit parallel data into 9-bit parallel data. The converted data is supplied to an SP/ID adding circuit 63. The resultant 9-bit parallel data of which sync patterns (SPs) and ID patterns (IDs) have been added is supplied to a parallel/serial converting circuit 64. The parallel/serial converting circuit 64 converts the parallel data into serial data. The serial data is recorded on a tape through an RM amplifier 39.

On the other hand, serial data reproduced from a tape is supplied to a serial/parallel converting circuit 65 through an RF amplifier 41. The serial/parallel converting circuit 65 converts the serial data into 9-bit parallel data. At this point, regardless of SPs and IDs, data is randomly converted into parallel data. An SP/ID extracting circuit 66 extracts SPs and IDs from the parallel data. The parallel data, SPs, and IDs are supplied to an 8–9 inverse converting circuit 67. The 8–9 inverse converting circuit 67 performs a bit converting process corresponding to SPs and IDs extracted by the SP/ID extracting circuit 66. Thus, a bit matching process for the data is performed. In addition, the 8–9 inverse converting circuit 67 generates a timing signal that represents the top position of a block. The 8–9 inverse converting circuit 67 supplies the 8-bit parallel data to the C1 decoder 43 through a terminal 68.

Figure 10:
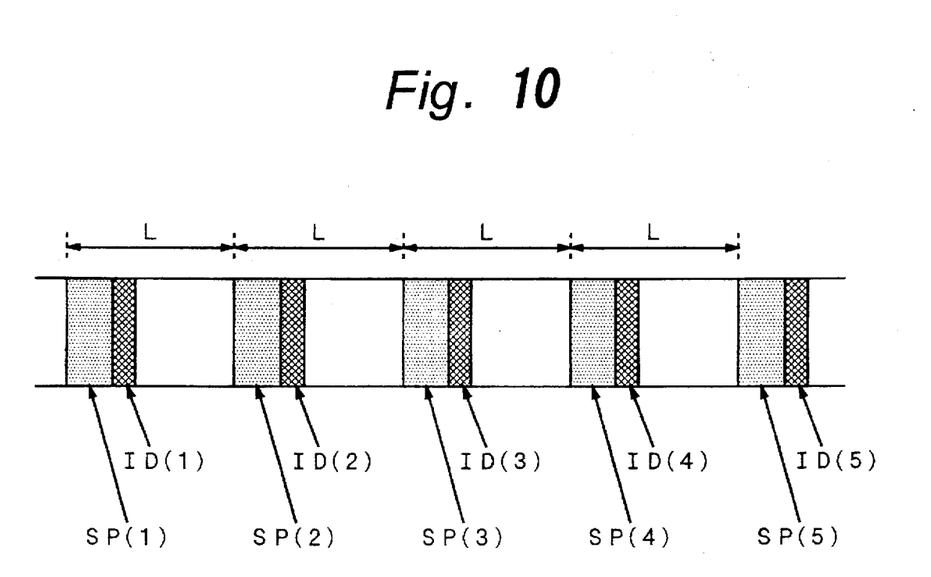
FIG. 10 is a schematic diagram showing a tape with sync patterns and ID patterns.

FIG. 10 is a schematic diagram showing a tape in which SPs and IDs are added corresponding to a first method by the SP/ID pattern adding circuit 63. Referring to FIG. 10, SPs are recorded as fixed patterns at predetermined intervals (L in the drawing). SPs are followed by relevant IDs. In other words, SP(1) is just followed by ID(1). SP(2) is just followed by ID(2). Likewise, each SP is just followed by a relevant ID. On the other hand, IDs are recorded in such a manner that the pattern value of each ID is decremented by 1. Assuming that ID(1)=ID, IDs are recorded in such a manner that ID(2)=ID−1, ID(3)=ID−2, and so forth.

Figure 11:
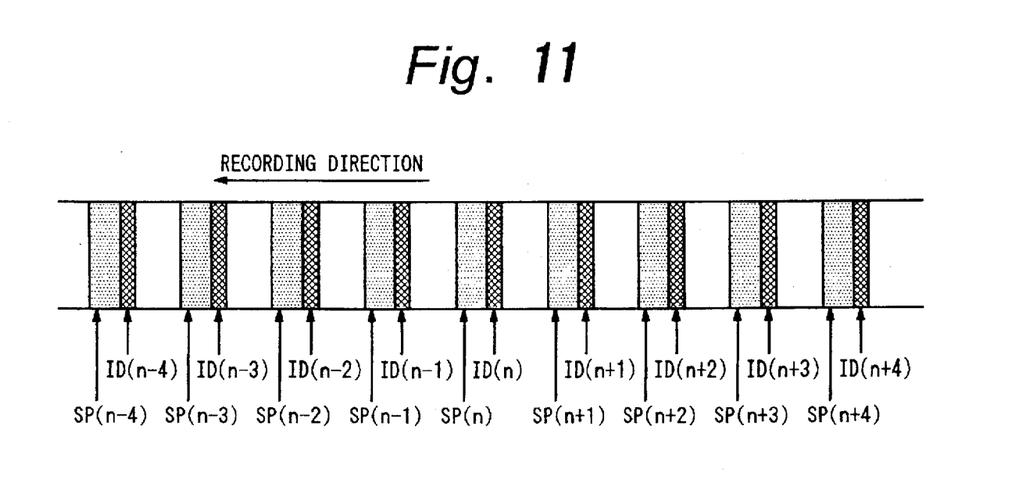
FIG. 11 is a schematic diagram showing a tape with sync patterns and ID patterns.

FIG. 11 is a schematic diagram showing a tape of which SPs and IDs are added corresponding to a second method by the SP/ID adding circuit 63. In FIG. 11, it is assumed that an N-th SP is recorded as SP(n) and that an N-th ID is recorded as ID(n). When data is recorded in the recording direction shown in FIG. 11, based on SP(n), the pattern values of the backward positioned SPs are decremented by 1. In contrast, the pattern values of the backward positioned SPs are incremented by 1. The pattern values of IDs vary as with the pattern values of SPs.

SPs that have been recorded in such a manner are extracted as correct SPs when the following conditions are satisfied. At this point, it is assumed that the comparisons are performed in the range of ±4L based on SP(n) and that L represents the distance from a considered SP to another SP that just follows (precedes) the considered SP.

(1) In the case that the distance between an extracted SP(n) and an SP(n−1) is 1L and that ID(n−1)=ID(n)+1, (2) in the case that the distance between an extracted SP(n) and an SP(n−2) is 2L and that ID(n−2)=ID(n)+2, (3) in the case that the distance between an extracted SP(n) and an SP(n−3) is 3L and that ID(n−3)=ID(n)+3, (4) in the case that the distance between an extracted SP(n) and an SP(n−4) is 4L and that ID(n−4)=ID(n)+4, (5) in the case that the distance between an extracted SP(n) and an SP(n+1) is 1L and that ID(n+1)=ID(n)−1, (6) in the case that the distance between an extracted SP(n) and an SP(n+2) is 2L and that ID(n+2)=ID(n)−2, (7) in the case that the distance between an extracted SP(n) and an SP(n+3) is 3L and that ID(n+3)=ID(n)−3, or (8) in the case that the distance between an extracted SP(n) and an SP(n+4) is 4L and that ID(n+4)=ID(n)−4.

As described above, in addition to the correlation of SP information, since the correlation of IDs is detected with ID information, SPs can be prevented from being incorrectly extracted. Moreover, since the correlation of IDs is detected in a wide range of (±4L), the extracting ratio of SPs can be improved.

Figure 12:
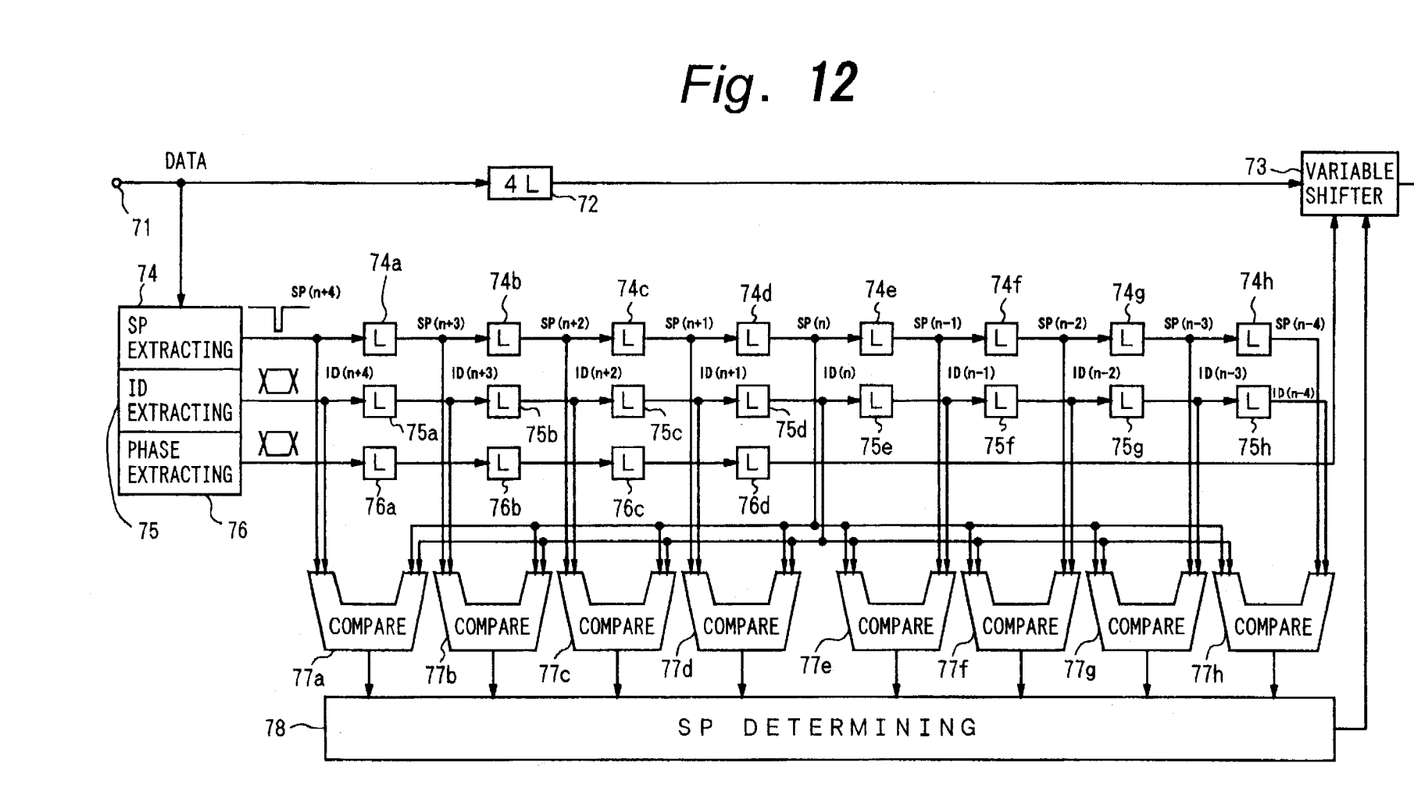
FIG. 12 is a detailed block diagram showing an SP/ID extracting circuit.

FIG. 12 is a detailed block diagram showing the SP/ID extracting circuit 66. Random parallel data that is input through a terminal 71 is supplied to a delaying circuit 72. The delaying circuit 72 delays the parallel data for 4L. The output data of the delaying circuit 72 is supplied to a variable shifter (hereinafter simply termed shifter) 73. In addition, the input data is supplied to an extracting circuit system. An SP extracting circuit 74 extracts SPs from the input data. The SP extracting circuit 74 is connected to eight delaying circuits 74a to 74h that are connected in series. Each of the delaying circuits 74a to 74h delays an extracted SP for 1L. An ID extracting circuit 75 extracts IDs from the input data. The ID extracting circuit 75 is connected to eight delaying circuits 75a to 75h that are connected in series. Each of the delaying circuits 75a to 75h delays an extracted ID for 1L.

At this point, it is assumed that data extracted from the delaying circuits 74d and 75d is denoted by SP(n) and ID(n), respectively. In addition, it is assumed that extracted data that is input to the delaying circuits 74a and 75a is denoted by SP(n+4) and ID(n+4), respectively, and that extracted data that is output from the delaying circuits 74h and 75h is denoted by SP(n−4) and ID(n−4), respectively.

A phase extracting circuit 76 extracts the phase of the input data as the phase in the SP/ID adding circuit 63 of the recording circuit system. The phase extracting circuit 76 is connected to four delaying circuits 76a to 76d that are connected in series. Each of the delaying circuits 76a to 76d delays extracted phase information for 1L. Output data of the delaying circuit 76d is supplied to the shifter 73.

Output data of the delaying circuits 74d and 75d is supplied to comparing circuits 77a to 77h. SPs that are input to the delaying circuits 74a to 74h and IDs that are input to the delaying circuits 75a to 75h are supplied to the comparing circuits 77a and 77d. In other words, SPs and IDs that are input to the delaying circuits 74a and 75a are supplied to the comparing circuit 77a. In addition, SPs that are output from the delaying circuits 74e to 74h and IDs that are output from the delaying circuits 75e to 75h are supplied to the comparing circuits 77e to 77h, respectively. In other words, for example, SPs and IDs that are input to the delaying circuits 74e and 75e are supplied to the comparing circuit 77e.

The comparing circuit 77a determines whether or not the phases of SP(n+4) and ID(n+4) are the same and whether or not the phases of SP(n) and ID(n) are the same (as a condition 1). In addition, the comparing circuit 77a determines whether or not the relation of ID(n+4)=ID(n)−4 is satisfied (as a condition 2). The comparing circuits 77b to 77d perform the same processes as the comparing circuit 77a does. On the other hand, the comparing circuit 77h determines whether or not the phases of SP(n−4) and ID(n−4) are the same and whether or not the phases of SP(n) and ID(n) are the same (as a third condition). In addition, the comparing circuit 77h determines whether or not the relation of ID(n−4)=ID(n)+4 is satisfied (as a fourth condition). The comparing circuits 77e to 77g perform the same processes as the comparing circuit 77h does. Output data of the comparing circuits 77a to 77h is supplied to an SP determining circuit 78. Only when any output data that is output from the comparing circuits 77a to 77h satisfies the conditions (1) and (2) or the conditions (3) and (4), the SP determining circuit 78 determines that the extracted SP(n) is a correct SP and outputs an SP extracting flag to the shifter 73. When the SP extracting flag is supplied to the shifter 73, the shifter 73 performs a bit matching process for the data received from the delaying circuit 73 corresponding to the phase information obtained by the phase extracting circuit. With the correlation of SPs that follow and precede a considered SP, the top and last SPs can be extracted without need to perform a special process.

Figure 13:
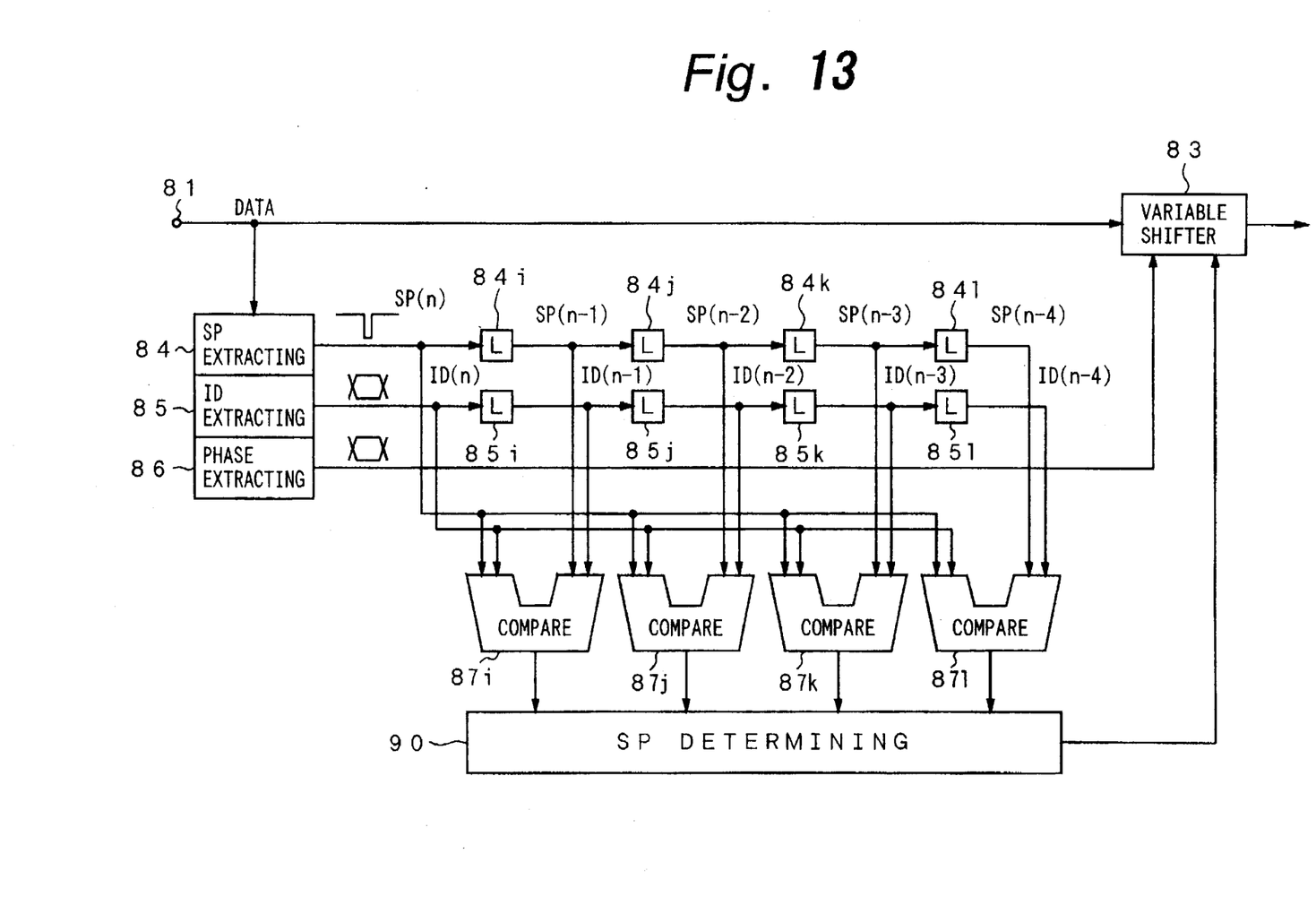
FIG. 13 is a detailed block diagram showing an SP/ID extracting circuit.
Figure 14:
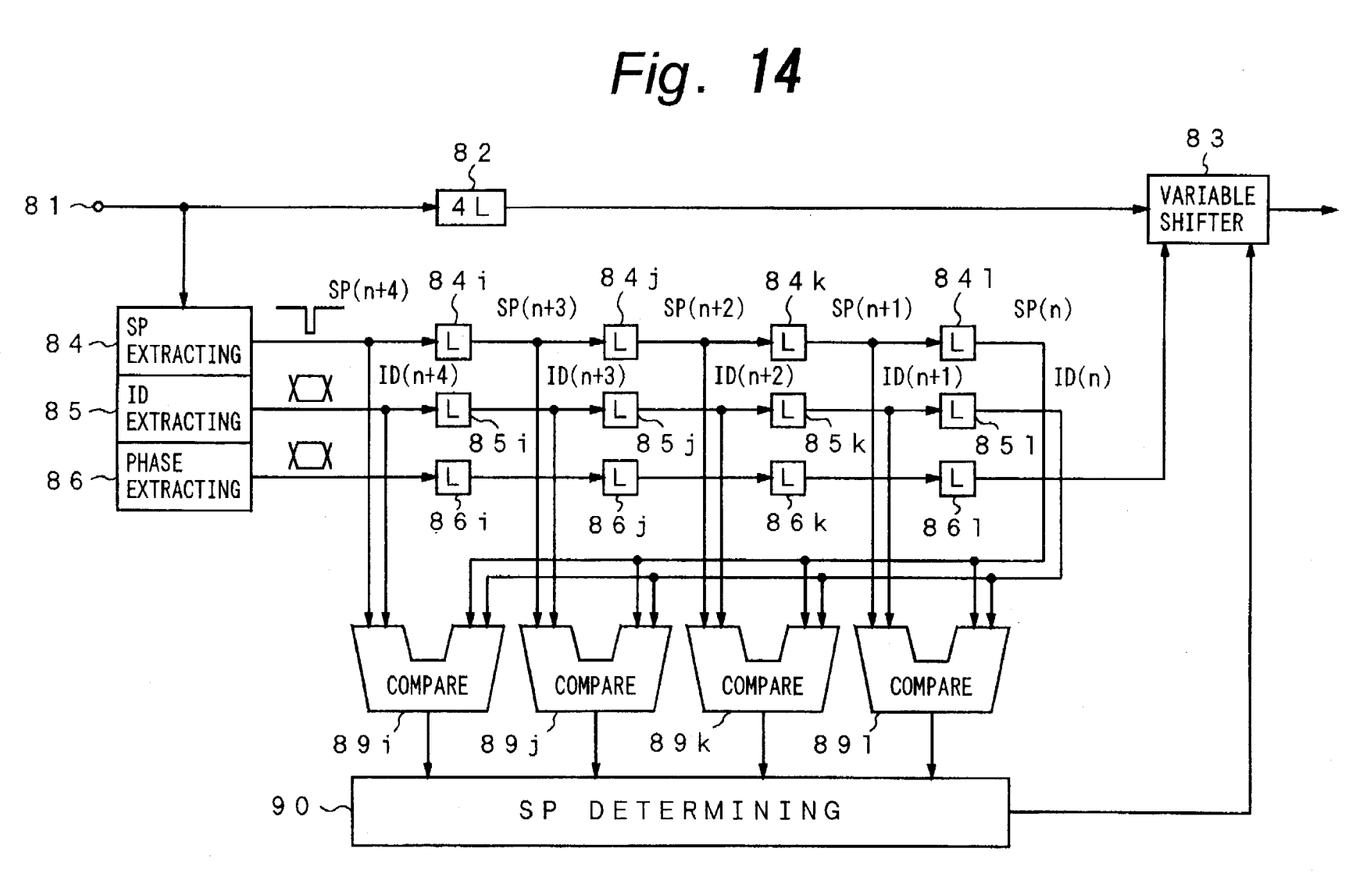
FIG. 14 is a detailed block diagram showing an SP/ID extracting circuit.

FIGS. 13 and 14 are block diagrams as a first modification of the SP/ID extracting circuit shown in FIG. 12. In FIGS. 13 and 14, similar blocks are denoted by similar reference numerals. The operation of the first modification is the same as the operation of the circuit shown in FIG. 12.

Data received through a terminal 81 is supplied to a shifter 83 and an extracting circuit system. An SP extracting circuit 84 is connected to four delaying circuits 84i to 84l that are connected in series. An ID extracting circuit 85 is connected to four delaying circuits 85i to 85l that are connected in series. Output data of a phase extracting circuit 86 is supplied to the shifter 83. SP(n) and ID(n) are supplied from the SP extracting circuit 84 and the ID extracting circuit 85 to comparing circuits 87i to 87l. Output data of each delaying circuit is supplied to a relevant comparing circuit. Output data of the comparing circuits 87i to 87l is supplied to an SP determining circuit 88. The SP determining circuit 88 determines that SP(n) is a correct SP only when the above-described conditions (3) and (4) are satisfied. When SP(n) is a correct SP, the SP determining circuit 88 outputs an SP extracting flag to the shifter 83. When the SP extracting flag is supplied to the shifter 83, it performs a bit matching process for the data corresponding to the extracted phase information.

In FIG. 14, data that is received through a terminal 81 is supplied to a delaying circuit 82 and an extracting circuit system. The delaying circuit 82 delays the input data for 4L. Output data of the delaying circuit 82 is supplied to a shifter 83. A phase extracting circuit 86 is connected to four delaying circuits 86i to 86l that are connected in series. The delaying circuit 86l supplies output data of the phase extracting circuit 86 to the shifter 83. The comparing circuits 89i to 89l perform the same processes as the comparing circuits 87i to 87l do. Only when the above-described conditions (1) and (2) are satisfied, an SP determining circuit 90 determines that SP(n) is a correct SP and supplies an SP extracting flag to the shifter 83. The shifter 83 performs a bit matching process of the data corresponding to the extracted phase information.

Figure 15:
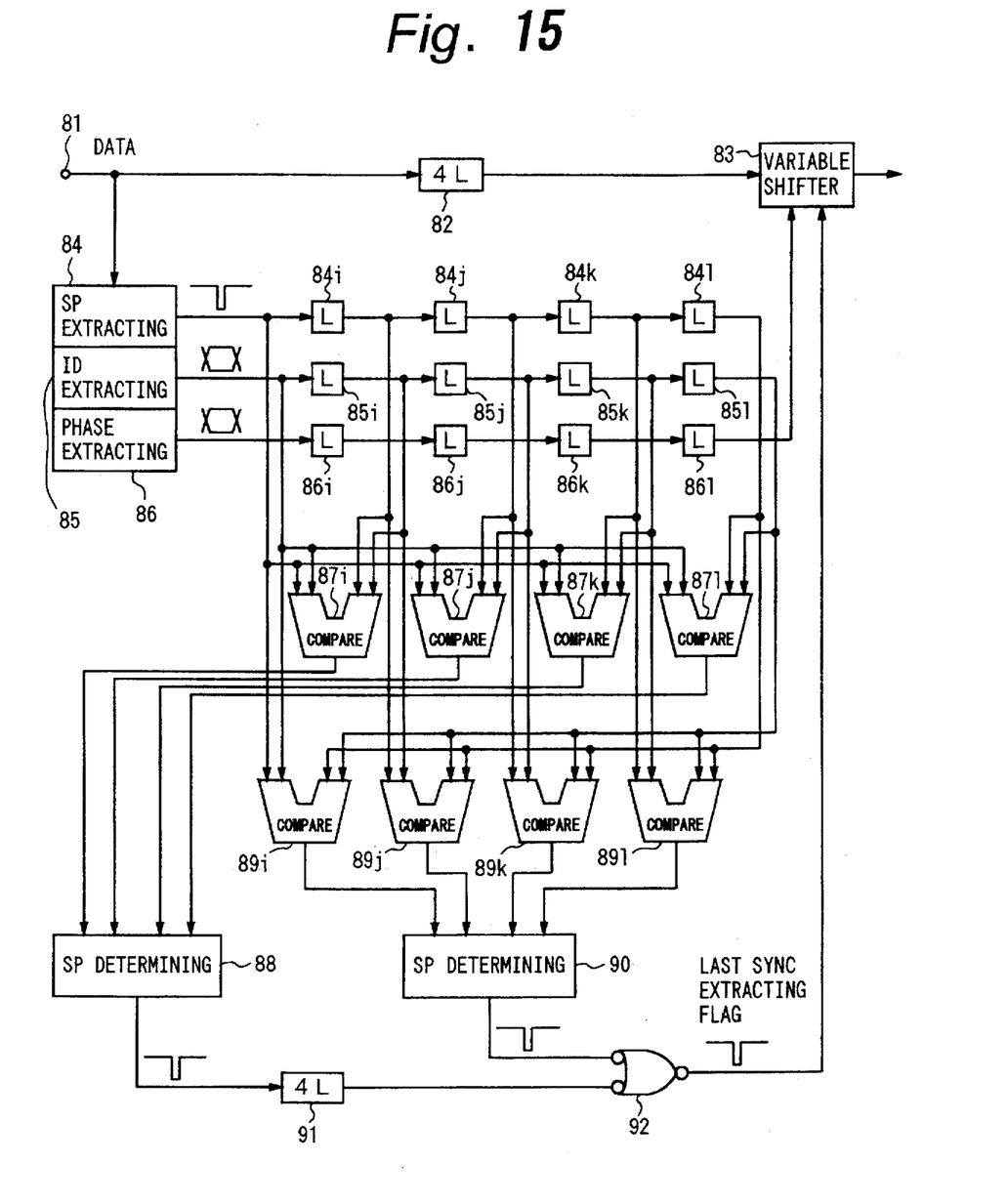
FIG. 15 is a detailed block diagram showing an SP/ID extracting circuit.

FIG. 15 is a block diagram equivalent to the SP/ID extracting block shown in FIGS. 13 and 14. The basic structure of the SP/ID extracting block shown in FIG. 15 is the same as those shown in FIGS. 13 and 14. In the structure shown in FIG. 15, only when the output data supplied to the SP determining circuit 88 satisfies the above-described conditions (3) and (4), an SP determining circuit 88 outputs an SP flag to a delaying circuit 91. The delaying circuit 91 delays an SP for 4L. On the other hand, only when the output data supplied to the SP determining circuit 90 satisfies the above-described conditions (1) and (2), the SP determining circuit 90 supplies the SP flag to the delaying circuit 91. Output data of the SP determining circuit 90 and the delaying circuit 91 is supplied to a NOR circuit 92. When either the SP determining circuit 90 or the delaying circuit 91 supplies the SP flag to the NOR circuit 92, it outputs the SP flag to a shifter 83. When the SP flag is supplied to the shifter 83, the shifter 83 performs a bit matching process for the data received from a delaying circuit 82 corresponding to the extracted phase information.

Figure 16:
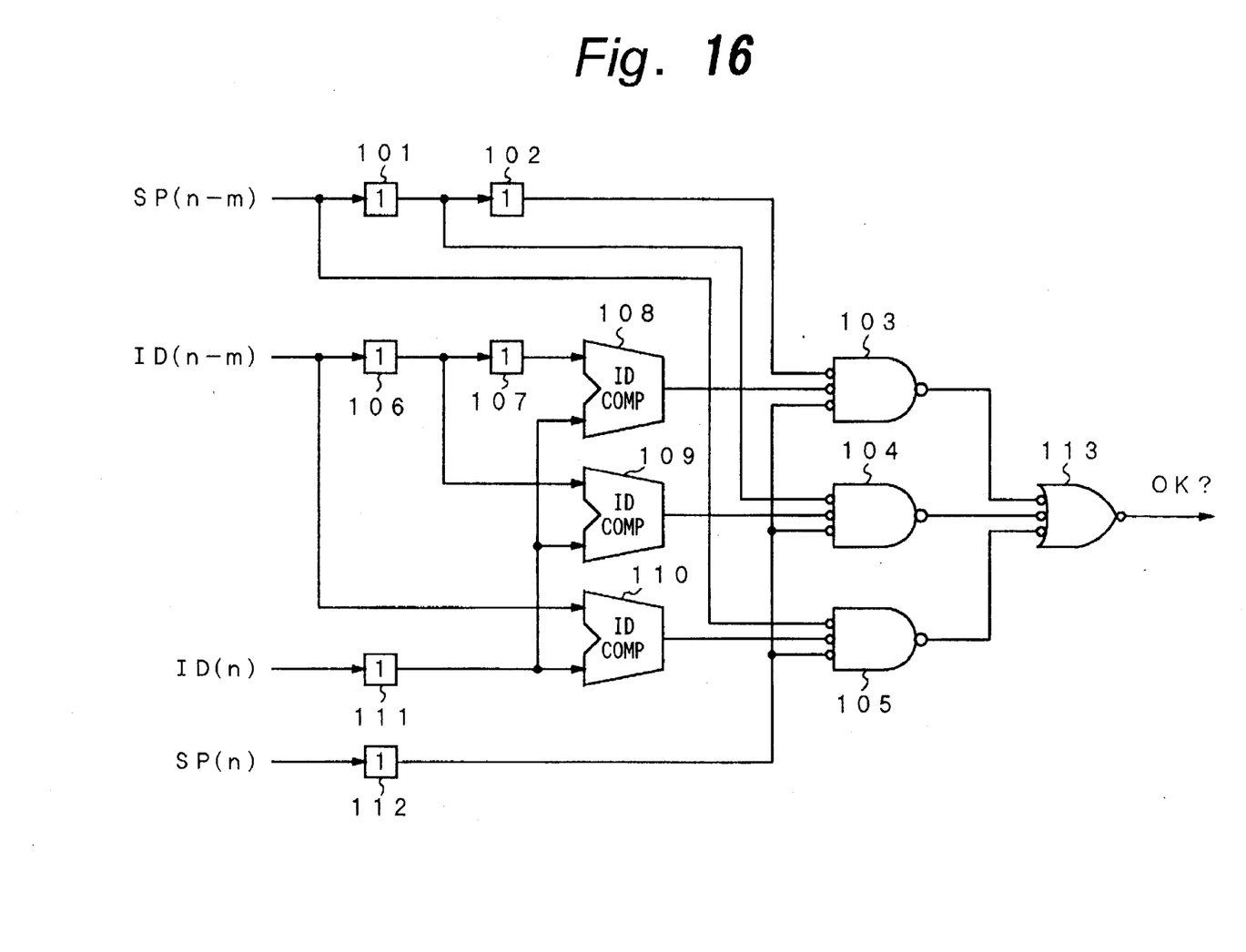
FIG. 16 is a detailed block diagram showing a comparing circuit.

FIG. 16 is a detailed block diagram showing the above-described comparing circuit. In the circuit shown in FIG. 16, to enhance the extracting ratio of SPs, a tolerance of $L\pm\alpha$ (where, for example, $\alpha=1$) is designated. In addition, each of delaying circuits shown in FIG. 16 delays data for one bit ($\alpha$) of clock. In the following description, it is assumed that logical value "1" represents that an SP has been extracted and that logical value "0" represents that an SP has not been extracted. SP(n−m) is supplied to a delaying circuit 101 and a NAND circuit 105. Output data of the delaying circuit 101 is supplied to a delaying circuit 102 and a NAND circuit 104. Output data of the delaying circuit 102 is supplied to an NAND circuit 103. ID(n−m) is supplied to a delaying circuit 106 and an ID comparing circuit 110. Output data of the delaying circuit 106 is supplied to a delaying circuit 107 and an ID comparing circuit 109. Output data of the delaying circuit 107 is supplied to an ID comparing circuit 108. ID(n) is delayed by a delaying circuit 111 for one bit of clock and supplied to ID comparing circuits 108, 109, and 110. Each of the ID comparing circuits 108, 109, and 110 compares ID(n) with ID(n−m). At this point, it is determined whether or not the above-described condition (2) or (4) is satisfied. The compared result is supplied to NAND circuits 103, 104, and 105. SP(n) is delayed by a delaying circuit 112 for one bit of clock and supplied to the NAND circuits 103, 104, and 105. Only when all received data is negative logic, each of the NAND circuits 103, 104, and 105 supplies output data to a NOR circuit 113. When any of the received data is negative logic, the NOR circuit 113 supplies an SP flag to the next shifter (not shown).

According to the present invention, when a considered sync pattern is extracted, other sync patterns that precede and follow the considered sync pattern (namely, forward and backward positioned sync patterns) are referenced. Thus, the top and last sync patterns can be extracted without need to perform a special process. In addition, with the forward and backward positioned sync patterns and ID patterns, the extracting ratio of sync patterns can be improved. Moreover, the extracted sync patterns, ID patterns, and phase information rather than data are delayed so as to detect the correlation of sync patterns. Thus, a tolerance can be designated to the intervals of the sync patterns. Consequently, the extracting ratio of sync patterns can be further improved.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A recording and reproducing apparatus for recording and reproducing digital data to and from a tape shaped recording medium, comprising:

modulating means for modulating the digital data;

adding means for adding a sync pattern SP and an ID pattern ID to each block of data that is output from said modulating means at predetermined intervals, wherein said adding means sets a value for each ID pattern ID according to a predetermined correlation between a position of an mth ID pattern ID(n+m) with respect to an nth ID pattern ID(n) and a distance from an nth sync pattern SP(n) to an mth sync pattern SP(n+m);

recording means for recording output data of said adding means to the tape shaped recording medium;

reproducing means for reproducing data from the tape shaped recording medium;

detecting means for detecting from a pattern of reproduced sync patterns a distance L between sync patterns in said pattern, and for detecting as valid an Mth reproduced sync pattern SP(n+M) when a value of a respective Mth reproduced ID pattern ID(n+M) at a position M with respect to said nth ID pattern ID(n) is equal to the value of said mth ID pattern ID(n+m) at a position m corresponding to said position M and at a distance mL set according to said predetermined correlation; and demodulating means for demodulating the reproduced data corresponding to the detected sync patterns.

2. The recording and reproducing apparatus as set forth in claim 1, wherein said detecting means includes:

sync extracting means for extracting sync patterns from the reproduced data;

ID extracting means for extracting ID patterns from the reproduced data;

first delaying means for delaying the extracted sync patterns by predetermined periods;

second delaying means for delaying the extracted ID patterns by said predetermined periods; and comparing means for determining whether or not phases of the sync patterns extracted by said sync extracting means accord with phases of the sync patterns that are output from said first delaying means, and for determining said predetermined correlation of said ID values of the ID patterns extracted by said ID sync extracting means and ID values of the ID patterns extracted from said second delaying means.

3. The apparatus of claim 2, wherein said modulating means performs 8–9 conversion of 8 parallel bits of said digital data into 9 parallel bits.

4. The apparatus of claim 1, wherein said adding means sets said value for each ID pattern ID according to said predetermined correlation by sequentially decrementing the value of each successive ID pattern ID along a direction of recording of said tape shaped recording medium and incrementing the value of each successive ID pattern ID along another direction of recording of said tape shaped recording medium.

5. The apparatus of claim 4, wherein said detecting means detects as valid said Mth reproduced sync pattern SP(n+M) when a value of said respective Mth reproduced ID pattern ID(n+M) at said position M is equal to a value of said nth ID pattern ID(n) plus M.

6. A recording apparatus for recording digital data to a tape shaped recording medium, comprising:

modulating means for modulating the digital data;

adding means for adding a sync pattern SP and an ID pattern ID to each block of data that is output from said modulating means at predetermined intervals, wherein said adding means sets a value for each ID pattern ID according to a predetermined correlation between a position of an mth ID pattern ID(n+m) with respect to an nth ID pattern ID(n) and a distance from an nth sync pattern SP(n) to an mth sync pattern SP(n+m); and recording means for recording output data of said adding means to the tape shaped recording medium.

7. A reproducing apparatus for reproducing digital data from a tape shaped recording medium, wherein a sync pattern SP and an ID pattern ID are added to each block of digital data at predetermined intervals, wherein a value for each ID pattern ID is set according to a predetermined correlation between a position of an mth ID pattern ID(n+m) with respect to an nth ID pattern ID(n) and a distance from an nth sync pattern SP(n) to an mth sync pattern SP(n+m), said apparatus comprising:

reproducing means for reproducing data from the tape shaped recording medium;

detecting means for detecting from a pattern of reproduced sync patterns a distance L between sync patterns in said pattern, and for detecting as valid an Mth reproduced sync pattern SP(n+M) when a value of a respective Mth reproduced ID pattern ID(n+M) at a position M with respect to said nth ID pattern ID(n) is equal to the value of said mth ID pattern ID(n+m) at a position m corresponding to said position M and at a distance mL set according to said predetermined correlation; and demodulating means for demodulating the reproduced data corresponding to the detected sync patterns.

\* \* \* \* \*